United States Patent

Minami et al.

(10) Patent No.: US 9,406,924 B2
(45) Date of Patent: Aug. 2, 2016

(54) NONAQUEOUS ELECTROLYTE SECONDARY BATTERY

(71) Applicant: SANYO Electric Co., Ltd., Moriguchi-shi, Osaka (JP)

(72) Inventors: Keisuke Minami, Hyogo (JP); Toyoki Fujihara, Hyogo (JP); Toshiyuki Nohma, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 163 days.

(21) Appl. No.: 14/146,938

(22) Filed: Jan. 3, 2014

(65) Prior Publication Data

US 2014/0205871 A1   Jul. 24, 2014

(30) Foreign Application Priority Data

Jan. 21, 2013   (JP) .................................. 2013-008350

(51) Int. Cl.

| | |
|---|---|
| *H01M 10/0567* | (2010.01) |
| *H01M 2/34* | (2006.01) |
| *H01M 10/42* | (2006.01) |
| *H01M 4/13* | (2010.01) |
| *H01M 4/62* | (2006.01) |
| *H01M 10/0525* | (2010.01) |
| *H01M 4/02* | (2006.01) |

(52) U.S. Cl.

CPC .............. *H01M 2/345* (2013.01); *H01M 4/13* (2013.01); *H01M 4/62* (2013.01); *H01M 10/0525* (2013.01); *H01M 10/0567* (2013.01); *H01M 10/4235* (2013.01); *H01M 2004/021* (2013.01); *Y02E 60/122* (2013.01)

(58) Field of Classification Search

CPC ............ H01M 2/345; H01M 10/4235; H01M 10/0567

USPC ................................ 429/61, 209–231.95, 326
See application file for complete search history.

(56) References Cited

U.S. PATENT DOCUMENTS

| | | | | |
|---|---|---|---|---|
| 6,333,128 | B1* | 12/2001 | Sunagawa et al. ........ | 429/231.95 |
| 6,365,299 | B1* | 4/2002 | Miyaki et al. .............. | 429/218.1 |
| 6,632,572 | B1 | 10/2003 | Takahashi et al. | |
| 2003/0165739 | A1* | 9/2003 | Kizu et al. .................. | 429/231.3 |
| 2006/0093914 | A1* | 5/2006 | Tanaka et al. .............. | 429/231.1 |

FOREIGN PATENT DOCUMENTS

| | | |
|---|---|---|
| JP | 2001-15155 A | 1/2001 |
| JP | 2004-134261 A | 4/2004 |

* cited by examiner

*Primary Examiner* — James Lee
(74) *Attorney, Agent, or Firm* — Westerman, Hattori, Daniels & Adrian, LLP

(57) ABSTRACT

A nonaqueous electrolyte secondary battery includes: an electrode assembly including positive and negative electrode plates; a nonaqueous electrolyte; an outer body; and a current interruption mechanism being provided on at least one of a conductive pathway between the positive electrode plate and a positive electrode external terminal and a conductive pathway between the negative electrode plate and a negative electrode external terminal. The nonaqueous electrolyte contains an overcharge inhibitor. The positive electrode active material layer has a specific surface area of 1.3 m²/g or less. The positive electrode active material layer has a total surface area of 41 m²/g or less with respect to the total mass of the overcharge inhibitor in the nonaqueous electrolyte. Thus the battery can increase a battery internal pressure inside the outer body in a short period of time to activate the current interruption mechanism to interrupt the conductive pathway if the battery is overcharged.

9 Claims, 3 Drawing Sheets

NONAQUEOUS ELECTROLYTE SECONDARY BATTERY

TECHNICAL FIELD

The present invention relates to a nonaqueous electrolyte secondary battery including a current interruption mechanism that is activated with an increase in the battery internal pressure.

BACKGROUND ART

In recent years, nonaqueous electrolyte secondary batteries typified by a lithium ion secondary battery having a large capacity have been developed to be used for, for example, vehicles such as hybrid electric vehicles (HEVs) and electric vehicles (EVs) and for large-scale storage battery systems.

A lithium ion secondary battery contains a material capable of absorbing and desorbing lithium ions, such as a carbon material and a silicon material, as a negative electrode active material, and a lithium transition-metal oxide such as $LiCoO_2$, $LiNiO_2$, and $LiMn_2O_4$, as a positive electrode active material, and includes an electrolyte in which a lithium salt as a solute is dissolved in an organic solvent.

In a lithium ion secondary battery in an overcharged state, lithium is excessively extracted from the positive electrode, and lithium is excessively inserted into the negative electrode. Thus, both the positive and negative electrodes become thermally unstable. The thermally unstable positive and negative electrodes cause an organic solvent contained in the electrolyte to decompose. This invites a sudden exothermic reaction, and the battery abnormally generates heat to impair the reliability.

To solve such a problem, for example, a lithium ion secondary battery has been developed (see JP-A-2004-134261) in which at least one of biphenyl, cyclohexylbenzene, and diphenyl ether is added as an overcharge inhibitor to the electrolyte so as to prevent the increase in temperature if the battery is overcharged.

Another lithium ion secondary battery has been developed (see JP-A-2001-015155) in which an alkylbenzene derivative or a cycloalkylbenzene derivative having a tertiary carbon atom adjacent to the phenyl group is added to an organic solvent in the electrolyte so as to ensure the safety of an overcharged battery without adversely affecting battery characteristics such as low-temperature characteristics and storage characteristics.

If the lithium ion secondary battery is overcharged, an additive such as cumene, 1,3-diisopropylbenzene, 1,4-diisopropylbenzene, 1-methylpropylbenzene, 1,3-bis(1-methylpropyl)benzene, 1,4-bis(1-methylpropyl)benzene, cyclohexylbenzene, and cyclopentylbenzene starts to decompose and generates gas. Concurrently with this, a polymerization reaction starts to generate polymerization heat. If the overcharging continues in this condition, the amount of the gas increases, and after 15 to 19 minutes from the start of the overcharging, a current interruption sealing plate is activated to interrupt the overcharge current. As a result, the battery temperature gradually decreases.

The techniques described in JP-A-2004-134261 and JP-A-2001-015155 achieve a certain effect. However, the nonaqueous electrolyte secondary battery having a large capacity used for vehicles and the like requires further improved reliability.

SUMMARY

An advantage of some aspects of the invention is to provide a highly reliable nonaqueous electrolyte secondary battery that can increase a battery internal pressure in a short period of time to activate a current interruption mechanism if the battery is overcharged.

A nonaqueous electrolyte secondary battery of an aspect of the invention includes: an electrode assembly including a positive electrode plate and a negative electrode plate, the positive electrode plate having a positive electrode active material layer containing a positive electrode active material on a surface of a positive electrode substrate; a nonaqueous electrolyte; an outer body storing the electrode assembly and the nonaqueous electrolyte; a positive electrode external terminal; a negative electrode external terminal; and a current interruption mechanism being provided on at least one of a conductive pathway between the positive electrode plate and a positive electrode external terminal and a conductive pathway between the negative electrode plate and a negative electrode external terminal, the current interruption mechanism interrupting the conductive pathway with an increase in pressure in the outer body. The nonaqueous electrolyte contains an overcharge inhibitor. The positive electrode active material layer has a specific surface area of 1.3 $m^2/g$ or less. The positive electrode active material layer has a total surface area of 41 $m^2/g$ or less with respect to the total mass of the overcharge inhibitor in the nonaqueous electrolyte.

The inventors of the invention have carried out various studies and have found that the control of the specific surface area of the positive electrode active material layer and the ratio of the total surface area of the positive electrode active material layer with respect to the total mass of the overcharge inhibitor in the nonaqueous electrolyte within particular ranges can increase the battery internal pressure in a short period of time to activate the current interruption mechanism if the battery is overcharged. The positive electrode active material layer more preferably has a specific surface area of 1.2 to 1.3 $m^2/g$. The positive electrode active material layer preferably has a total surface area of 39 to 41 $m^2/g$ or less with respect to the total mass of the overcharge inhibitor in the nonaqueous electrolyte.

It is preferable that the overcharge inhibitor be a compound having at least one of a cyclohexyl group and a phenyl group. For example, the overcharge inhibitor may be cumene, 1,3-diisopropylbenzene, 1,4-diisopropylbenzene, 1-methylpropylbenzene, 1,3-bis(1-methylpropyl)benzene, 1,4-bis(1-methylpropyl)benzene, t-butylbenzene, t-dibutylbenzene, t-amylbenzene, t-diamylbenzene, cyclohexylbenzene, cyclopentylbenzene, biphenyl, and diphenyl ether. In particular, cyclohexylbenzene and biphenyl are preferably used.

The positive electrode external terminal and the negative electrode external terminal preferably protrude from the outer body toward the outside of the battery, and are each preferably fixed to a sealing plate constituting the outer body through an insulating member. Alternatively, the positive electrode plate or the negative electrode plate may be electrically connected to the outer body, and thus the outer body may serve as the positive electrode external terminal or the negative electrode external terminal. The current interruption mechanism may have any structure as long as it can interrupt the conductive pathway from the electrode assembly to the battery outside with an increase in pressure in the outer body. Although the current interruption mechanism may be activated at any pressure, it is preferably set so as to be activated at a pressure of about 0.4 to 1.0 MPa.

It is preferable that the positive electrode active material layer have a porosity, which represents the ratio of voids in the layer, of 30 to 40% by volume. The positive electrode active material layer preferably contains a positive electrode active material, a conductive agent, and a binder. The positive electrode active material layer contains the positive electrode active material preferably in a ratio of 90% by mass or more. The positive electrode active material layer contains the positive electrode active material and the conductive agent preferably in a total ratio of 95% by mass or more. The positive electrode active material layer preferably has a packing density of 2.0 to 2.9 g/cm$^3$, more preferably 2.2 to 2.8 g/cm$^3$, and even more preferably 2.4 to 2.8 g/cm$^3$. The positive electrode substrate preferably contains metal foil, and in particular, the metal foil is preferably made of aluminum or an aluminum alloy.

The positive electrode active material preferably has an average particle size of 8 to 16 μm and more preferably 10 to 15 μm.

The positive electrode active material preferably has a specific surface area of 0.4 m$^2$/g or less and more preferably 0.25 to 0.4 m$^2$/g. The positive electrode active material preferably has a total surface area of 10 m$^2$/g or less and more preferably 8 to 10 m$^2$/g with respect to the total mass of the overcharge inhibitor in the nonaqueous electrolyte.

In the invention, it is preferable that the positive electrode active material be a lithium transition-metal oxide, and that a negative electrode active material contained in the negative electrode plate be a carbon material. A battery having the structure exhibits more marked advantages of the invention.

In the invention, it is preferable that a protective layer containing an inorganic oxide and an insulating binder be provided on a surface of at least one of the positive electrode plate and the negative electrode plate, and that the inorganic oxide be at least one selected from the group consisting of alumina, titania, and zirconia. This enables the production of a more highly reliable nonaqueous electrolyte secondary battery.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment for carrying out the present invention will be described below in detail using examples and comparative examples. The examples below show examples of a nonaqueous electrolyte secondary battery for embodying the technical idea of the invention and is not intended to specify the invention as the examples. The invention is equally applicable to various modifications without departing from the technical idea shown in the scope of claims.

Figure 1:
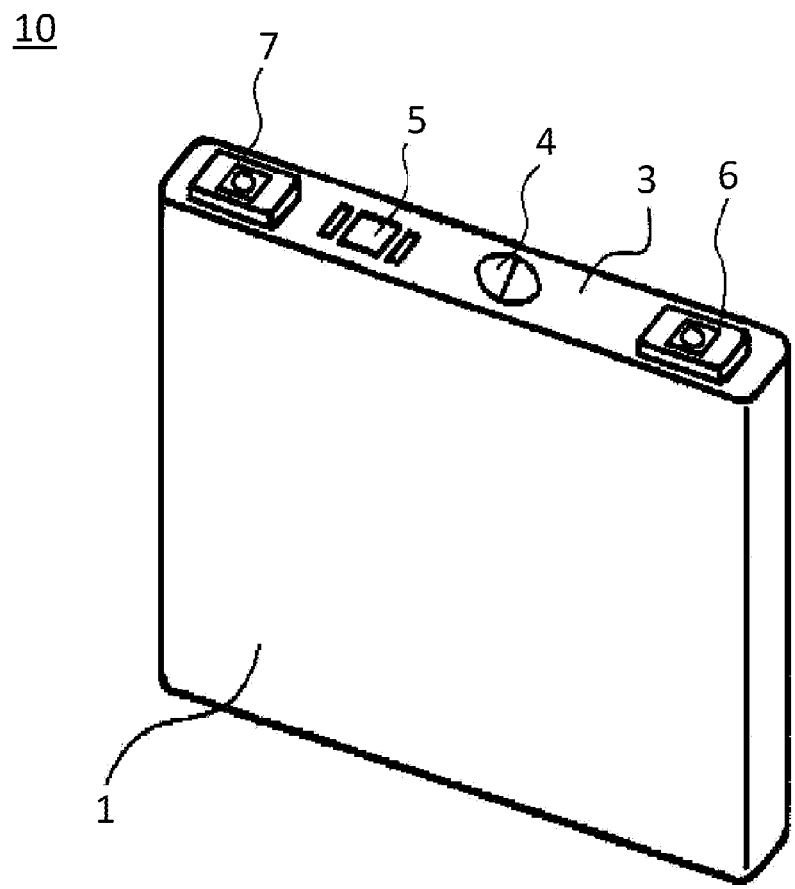
FIG. 1 is a perspective view of a nonaqueous electrolyte secondary battery in examples and comparative examples.
Figure 2:
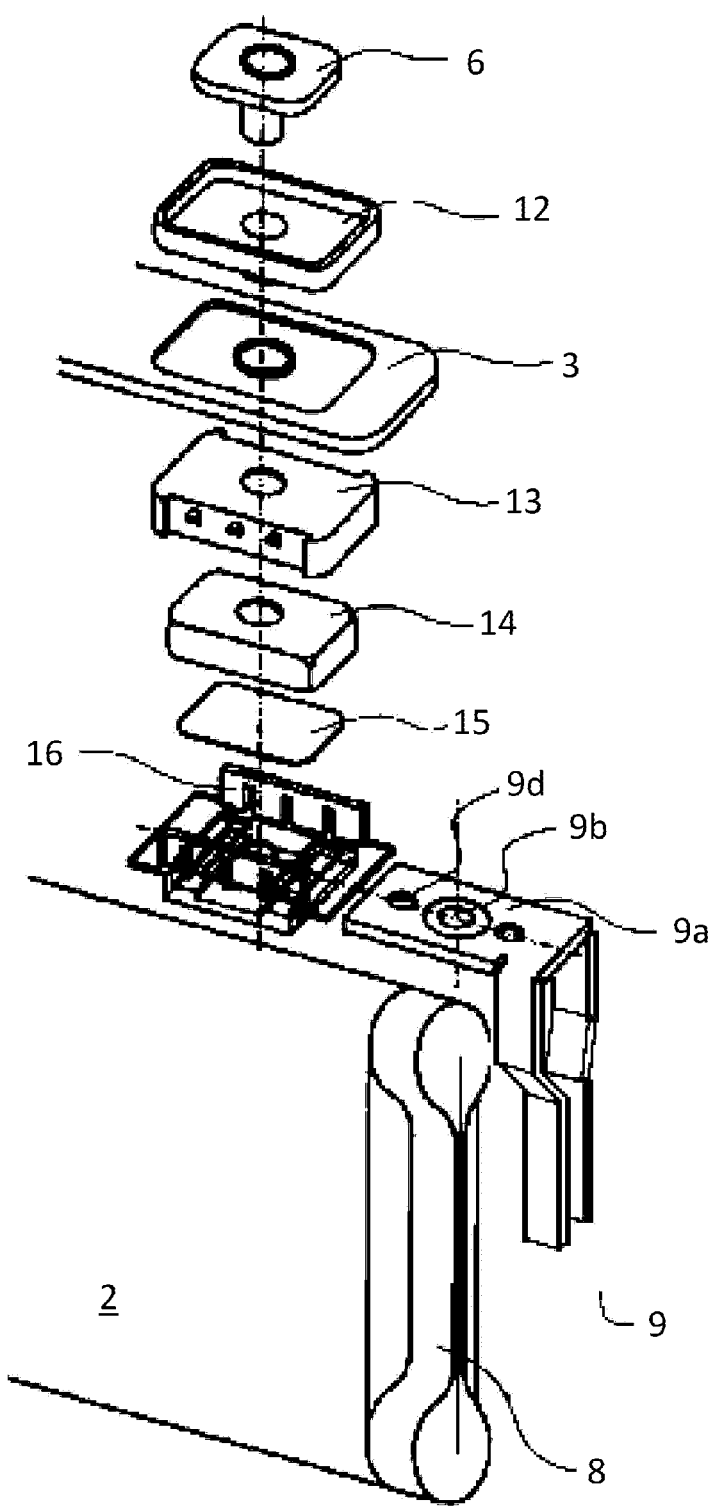
FIG. 2 is an exploded perspective view of a positive electrode conductive pathway in the nonaqueous electrolyte secondary battery shown in FIG. 1.
Figure 3:
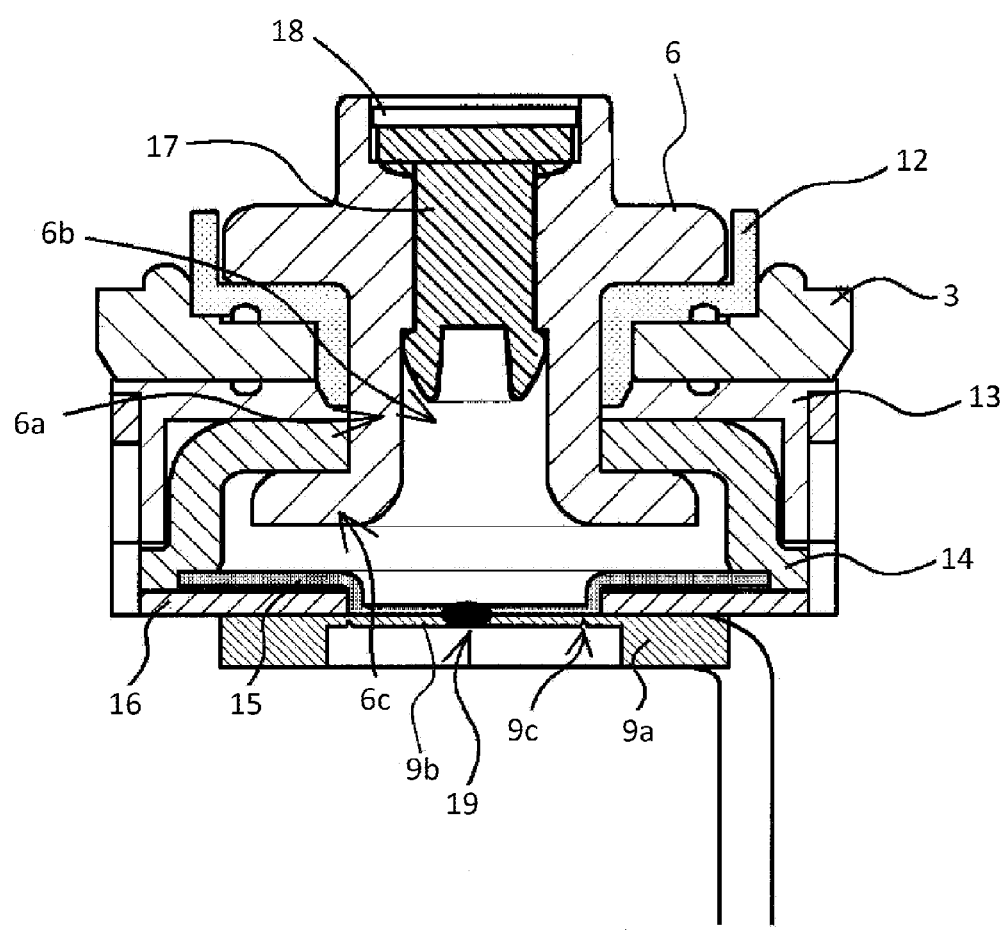
FIG. 3 is a sectional view of the positive electrode conductive pathway in the nonaqueous electrolyte secondary battery shown in FIG. 1.

First, the structure of a prismatic lithium ion secondary battery 10 as the nonaqueous electrolyte secondary battery in the examples and comparative examples will be described with reference to FIG. 1 to FIG. 3. As shown in FIG. 1, the prismatic lithium ion secondary battery 10 includes a bottomed cylindrical, prismatic outer can 1. The outer can 1 stores a flat electrode assembly 2 in the lateral direction with respect to the can axis direction of the outer can 1. The flat electrode assembly 2 is formed by winding a positive electrode plate and a negative electrode plate that are stacked with a separator interposed therebetween and forming the wound electrode into a flat shape. The mouth of the outer can 1 is sealed with a sealing plate 3. The sealing plate 3 includes a gas exhaust valve 4, an electrolyte pour hole (not shown in the drawings), and a sealing member 5 for sealing the electrolyte pour hole. The gas exhaust valve 4 is designed to break if a gas pressure higher than the working pressure of a current interruption mechanism is applied, whereby gas will be exhausted to the outside of the battery.

A positive electrode external terminal 6 and a negative electrode external terminal 7 are provided on the outer face of the sealing plate 3. The shape of both the positive electrode external terminal 6 and the negative electrode external terminal 7 can be changed as appropriate according to an intended use of the lithium ion secondary battery, for example, whether a battery is singly used or a plurality of batteries are connected in series or in parallel. The positive electrode external terminal 6 and the negative electrode external terminal 7 may be used with, for example, a terminal plate or a bolt-like external connecting terminal (not shown in the drawings) attached thereto.

Next, the structure of the current interruption mechanism provided in the prismatic lithium ion secondary battery 10 will be described with reference to FIG. 2 and FIG. 3. FIG. 2 and FIG. 3 are an exploded perspective view of the positive electrode conductive pathway and a sectional view of the positive electrode conductive pathway, respectively. A collector 9 is connected to both outer faces of a positive electrode substrate exposed portion 8 protruded from one end face of the electrode assembly 2. The positive electrode external terminal 6 has a cylinder portion 6a, and a through-hole 6b is formed in the cylinder portion 6a. The cylinder portion 6a of the positive electrode external terminal 6 is inserted into through-holes that are provided in a gasket 12, a sealing plate 3, an insulating member 13, and a cup-like conductive member 14, and a leading end 6c of the positive electrode external terminal 6 is crimped to integrally fix the members.

The peripheral part on the lower end of a cylindrical portion of the conductive member 14 is welded to the periphery of an inversion plate 15. The center part of the inversion plate 15 is laser-welded to a thin-walled portion 9b formed in a tab 9a of the collector 9 to thus form a welded portion 19. An annular groove 9c is formed around the welded portion 19 in the thin-walled portion 9b formed in the tab 9a of the collector 9. A resin insulating member 16 having a through-hole is disposed between the tab 9a of the collector 9 and the inversion plate 15. Through the through-hole of the insulating member 16, the tab 9a of the collector 9 is connected to the inversion plate 15. In accordance with the structure above, the positive electrode substrate exposed portion 8 is electrically connected to the positive electrode external terminal 6 through the collector 9, the tab 9a of the collector 9, the inversion plate 15, and the conductive member 14.

In the structure, the inversion plate 15, the tab 9a of the collector 9, and the insulating member 16 constitute the current interruption mechanism. Specifically, the inversion plate 15 is deformed toward the through-hole 6b of the positive electrode external terminal 6 when the pressure in the outer can 1 increases. The center part of the inversion plate 15 is welded to the thin-walled portion 9b of the tab 9a of the collector 9. When the pressure in the outer can 1 exceeds a predetermined value, the thin-walled portion 9b of the tab 9a of the collector 9 will be broken at the annular groove 9c to thus interrupt the electrical connection between the inversion plate 15 and the collector 9. The current interruption mechanism may have, other than the structure above, a structure using metal foil welded to the inversion plate 15, in which the periphery of the welded portion of the metal foil is welded to the collector and the metal foil will broken when the pressure in the outer can 1 increases to deform the inversion plate 15. Alternatively, the connection strength between the tab 9a of the collector 9 and the inversion plate 15 may be controlled so that the connection between the tab 9a of the collector 9 and the inversion plate 15 will be broken when the pressure in the outer can 1 exceeds a predetermined value.

The through-hole 6b formed in the positive electrode external terminal 6 is sealed with a rubber terminal stopper 17. A metal plate member 18 is disposed on an upper portion of the terminal stopper 17.

Although the embodiment of providing the current interruption mechanism on the positive electrode conductive pathway has been described, the current interruption mechanism may be provided on the negative electrode conductive pathway.

To complete the prismatic lithium ion secondary battery 10, the electrode assembly 2 electrically connected to the positive electrode external terminal 6 and the negative electrode external terminal 7 is inserted into the outer can 1, the sealing plate 3 is then fitted to the mouth of the outer can 1, and the fitting portion is laser-welded to seal up the mouth. A predetermined amount of an electrolyte is poured through the electrolyte pour hole (not shown in the drawings), and the electrolyte pour hole is sealed with the sealing member 5.

In the prismatic lithium ion secondary battery 10, when the pressure in the outer can 1 further increases after the current interruption mechanism is activated, the gas exhaust valve 4 provided on the sealing plate 3 is opened to exhaust gas to the outside of the battery.

Next, a method of manufacturing the prismatic lithium ion secondary battery 10 will be described in further detail.

Preparation of Positive Electrode Plate $Li_2CO_3$ and $(Ni_{0.35}Co_{0.35}Mn_{0.3})_3O_4$ were mixed so as to give a molar ratio of Li and $(Ni_{0.35}Co_{0.35}Mn_{0.3})$ of 1:1. Next, the mixture was baked in an air atmosphere at 900° C. for 20 hours to yield a lithium transition-metal oxide represented by $LiNi_{0.35}Co_{0.35}Mn_{0.3}O_2$ as a positive electrode active material. The positive electrode active material obtained as above, flaked graphite and carbon black as conductive agents, and a solution of polyvinylidene fluoride (PVdF) as a binder in N-methylpyrrolidone (NMP) were kneaded so as to give a mass ratio of the positive electrode active material:flaked graphite and carbon black:PVdF of 91:6:3 to prepare a positive electrode slurry. The prepared positive electrode slurry was applied onto each face of aluminum alloy foil (a thickness of 15 μm) as a positive electrode substrate and then dried to remove NMP used as the solvent for preparing the slurry, thereby yielding a positive electrode active material mixture layer. The resultant object was rolled with a roller to produce a positive electrode active material layer having a predetermined packing density (2.55 g/cm$^3$). The rolled positive electrode plate was cut into a predetermined size so as to form a positive electrode substrate exposed portion in which no positive electrode active material layer was formed on each face along one edge in the longitudinal direction across the width of the positive electrode plate, whereby a positive electrode plate was prepared.

Preparation of Negative Electrode Plate

Natural graphite as a negative electrode active material, carboxymethylcellulose (CMC) as a thickening agent, and styrene-butadiene-rubber (SBR) as a binder were kneaded together with water to prepare a negative electrode slurry. Here, the negative electrode active material, CMC, and SBR were mixed so as to give a mass ratio of 98:1:1. Next, the prepared negative electrode slurry was applied onto each face of copper foil (a thickness of 10 μm) as a negative electrode substrate and then dried to remove water used as the solvent for preparing the slurry, thereby yielding a negative electrode active material mixture layer. The resultant object was rolled with a roller to produce a negative electrode active material layer having a predetermined packing density (1.11 g/cm$^3$).

Next, a protective layer was formed on the surface of the negative electrode active material layer. Alumina powder, a binder (an acrylic resin), and NMP as a solvent were mixed so as to give a weight ratio of 30:0.9:69.1, and the mixture was subjected to mixing and dispersing treatment with a bead mill to yield a protective layer slurry. The protective layer slurry prepared as above was applied onto the negative electrode mixture layer of the negative electrode plate and dried to remove NMP used as the solvent, thereby forming a protective layer containing the alumina and the binder on the negative electrode surface. The protective layer containing the alumina and the binder had a thickness of 3 μm. The negative electrode plate was cut into a predetermined size so as to form a negative electrode substrate exposed portion in which no negative electrode active material layer was formed on each face along one edge in the longitudinal direction across the width of the negative electrode plate, whereby a negative electrode plate was prepared.

Preparation of Flat Electrode Assembly

The positive electrode plate and the negative electrode plate prepared as above were used. The positive electrode plate and the negative electrode plate were wound with a microporous polyethylene separator interposed therebetween so that the positive electrode substrate exposed portion was placed on one end in the winding axis direction and the negative electrode substrate exposed portion was placed on the other end, thereby yielding a cylindrical electrode assembly. The cylindrical electrode assembly was compressed to form a flat electrode assembly.

Preparation of Nonaqueous Electrolyte $LiPF_6$ as an electrolyte salt was added to a mixed solvent containing 40% by volume of ethylene carbonate (EC) and 60% by volume of diethyl carbonate (DEC) so as to give a concentration of 1 mol/L, and the whole was mixed. Cyclohexylbenzene was further added to the mixture so as to give a ratio of 4.5% by mass with respect to the mixed solvent, thereby yielding an electrolyte.

Preparation of Conductive Pathway

A procedure for preparing the positive electrode conductive pathway provided with a current interruption mechanism will be described. First, the resin gasket 12 was disposed on the top surface of the aluminum sealing plate 3, and the resin insulating member 13 and the aluminum conductive member 14 were disposed under the bottom surface of the sealing plate 3. Through each through-hole provided in the members, the cylinder portion 6a of the aluminum positive electrode external terminal 6 was inserted. The leading end 6c of the positive electrode external terminal 6 was crimped to integrally fix the positive electrode external terminal 6, the gasket 12, the sealing plate 3, the insulating member 13, and the conductive member 14. Subsequently, a connection portion between the leading end 6c of the positive electrode external terminal 6 and the conductive member 14 was laser-welded.

Next, the peripheral part on the lower end of a cylindrical portion of the cup-like conductive member 14 was welded to the periphery of the inversion plate 15 to completely seal the periphery. The inversion plate 15 used here was a thin aluminum plate having a downward protrusion formed by molding. The conductive member 14 and the inversion plate 15 was welded with laser welding.

The resin insulating member 16 was brought into contact with the inversion plate 15, and was fixed to the insulating member 13 with a latch. Next, a protrusion (not shown in the drawings) provided on the bottom surface of the insulating member 16 was inserted into a through-hole 9d provided in the tab 9a of the aluminum collector 9, and then the diameter of the protrusion was enlarged while the protrusion was being heated. This fixed the insulating member 16 to the collector 9. The region surrounded by the groove 9c of the collector 9 was laser-welded to the inversion plate 15. Subsequently, $N_2$ gas with a predetermined pressure was introduced from the top of the positive electrode external terminal 6 into the through-hole 6b to examine the sealing condition of the welded portion between the conductive member 14 and the inversion plate 15.

The terminal stopper 17 was inserted into the through-hole 6b of the positive electrode external terminal 6, and the plate member 18 of aluminum was laser-welded to be fixed to the positive electrode external terminal 6.

In the negative electrode conductive pathway, a resin gasket was disposed on the top surface of the sealing plate 3, and a resin insulating member and a negative electrode collector were disposed under the bottom surface of the sealing plate 3. Through each through-hole provided in the members, a cylinder portion of a negative electrode external terminal 7 was inserted. A leading end of the negative electrode external terminal 7 was crimped to integrally fix the negative electrode external terminal 7, the gasket, the sealing plate 3, the insulating member, and the negative electrode collector. Subsequently, a connection portion between the leading end of the negative electrode external terminal 7 and the negative electrode collector was laser-welded.

Preparation of Prismatic Lithium Ion Secondary Battery

The positive electrode collector 9 fixed to the sealing plate 3 by the above method was brought into contact with and resistance-welded to both outer faces of the positive electrode substrate exposed portion 8 of the electrode assembly 2, whereby the positive electrode collector 9 was welded and connected to a plurality of stacked layers of the positive electrode substrate exposed portion 8. In addition, the negative electrode collector fixed to the sealing plate 3 by the above method was brought into contact with and resistance-welded to both outer faces of the negative electrode substrate exposed portion of the electrode assembly 2, whereby the negative electrode collector was welded and connected to a plurality of stacked layers of the negative electrode substrate exposed portion. Each of the positive electrode collector 9 and the negative electrode collector is preferably formed by bending one plate.

The outer periphery of the electrode assembly 2 was wrapped with an insulating sheet (not shown in the drawings), and then the electrode assembly 2 with the insulating sheet was inserted into the prismatic outer can 1 of aluminum. The sealing plate 3 was fitted to the mouth of the outer can 1. The fitting portion between the sealing plate 3 and the outer can 1 was laser-welded.

The following will describe a method for determining the specific surface area of the positive electrode active material layer, the total surface area of the positive electrode active material layer, the specific surface area of the positive electrode active material, and the total surface area of the positive electrode active material.

Specific Surface Area of Positive Electrode Active Material Layer

The specific surface area of the positive electrode active material layer was determined as below.

First, the positive electrode plate prepared by the above method was cut to prepare three positive electrodes for surface area measurement. The positive electrode for surface area measurement included the positive electrode active material layer on each face of the positive electrode substrate and had a length of 5 cm and a width of 2 cm.

Next, the total surface area A ($m^2$) of the three positive electrodes for surface area measurement was determined with a specific surface area analyzer (Macsorb HM model-1200 series) manufactured by Mountech by the fluid process. The total mass C (g) of the three positive electrodes for surface area measurement was also determined. Next, three positive electrode substrates for surface area measurement having a length of 5 cm and a width of 2 cm were prepared, and the total surface area B ($m^2$) of the three positive electrode substrates for surface area measurement was determined in a similar manner to that for the positive electrodes for surface area measurement. The mass D (g) of the three positive electrode substrates for surface area measurement was also determined. Here, the surface area of the positive electrode substrate for surface area measurement was too small to be determined by the above method. Thus, the surface area of the positive electrode substrate for surface area measurement was considered as 0.006 $m^2$ (5 cm in length×2 cm in width×2 (both faces)×3 (the number of substrates)) in an assumption that the positive electrode substrate for surface area measurement had a surface without unevenness. The positive electrode substrate for surface area measurement actually has a surface with unevenness. The numerical values determined as above were used to calculate the specific surface area of the positive electrode active material layer ($m^2/g$) in accordance with the following equation:

Specific surface area of positive electrode active material layer ($m^2/g$)=(surface area A ($m^2$) of positive electrodes for surface area measurement−surface area B ($m^2$) of positive electrode substrates for surface area measurement)/(mass C (g) of positive electrodes for surface area measurement−mass D (g) of positive electrode substrates for surface area measurement).

Total Surface Area of Positive Electrode Active Material Layer

The specific surface area of the positive electrode active material layer determined by the above method was used to calculate the total surface area of the positive electrode active material layer contained in the positive electrode plate used in one prismatic lithium ion secondary battery.

Specific Surface Area of Positive Electrode Active Material

The specific surface area of the positive electrode active material was determined with a specific surface area analyzer (Macsorb HM model-1200 series) manufactured by Mountech by the fluid process.

Total Surface Area of Positive Electrode Active Material

The specific surface area of the positive electrode active material determined by the above method was used to calculate the total surface area of the positive electrode active material contained in the positive electrode plate used in one prismatic lithium ion secondary battery.

Example 1

The nonaqueous electrolyte prepared by the above method was poured so that the positive electrode active material layer had a total surface area of 39.7 m²/g with respect to the total mass of cyclohexylbenzene in the nonaqueous electrolyte and the positive electrode active material had a total surface area of 8.2 m²/g with respect to the total mass of cyclohexylbenzene in the nonaqueous electrolyte. The pour hole was then sealed with a blind rivet. In Example 1, the positive electrode active material layer of the positive electrode plate had a specific surface area of 1.256 m²/g, the positive electrode active material layer had a porosity of 37% by volume, the positive electrode active material contained in the positive electrode active material layer had a specific surface area of 0.286 m²/g, and the positive electrode active material had an average particle size of 14.4 nm. The positive electrode active material layer had a total surface area of 231.0 m², and the positive electrode active material had a total surface area of 53.6 m². The working pressure of the current interruption mechanism was set to 0.70 MPa.

Example 2

A prismatic lithium ion secondary battery of Example 2 was prepared in a similar manner to that in Example 1 except for the following: a positive electrode active material having an average particle size of 12.5 nm and a specific surface area of 0.336 m²/g was used, the positive electrode active material layer had a specific surface area of 1.289 m²/g, and the positive electrode active material layer had a porosity of 37% by volume; the positive electrode active material layer had a total surface area of 237.1 m², and the positive electrode active material had a total surface area of 63.0 m²; and the nonaqueous electrolyte was poured so that the positive electrode active material layer had a total surface area of 40.7 m²/g with respect to the total mass of cyclohexylbenzene in the nonaqueous electrolyte and the positive electrode active material had a total surface area of 9.6 m²/g with respect to the total mass of cyclohexylbenzene in the nonaqueous electrolyte.

Example 3

A prismatic lithium ion secondary battery of Example 3 was prepared in a similar manner to that in Example 1 except for the following: a positive electrode active material having an average particle size of 11.0 nm and a specific surface area of 0.340 m²/g was used, the positive electrode active material layer had a specific surface area of 1.283 m²/g, and the positive electrode active material layer had a porosity of 37% by volume; the positive electrode active material layer had a total surface area of 235.9 m², and the positive electrode active material had a total surface area of 63.8 m²; and the nonaqueous electrolyte was poured so that the positive electrode active material layer had a surface area of 40.5 m²/g with respect to the total mass of cyclohexylbenzene in the nonaqueous electrolyte and the positive electrode active material had a total surface area of 9.8 m²/g with respect to the total mass of cyclohexylbenzene in the nonaqueous electrolyte.

Comparative Example 1

A prismatic lithium ion secondary battery of Comparative Example 1 was prepared in a similar manner to that in Example 1 except for the following: a positive electrode active material having an average particle size of 7.0 nm and a specific surface area of 0.423 m²/g was used, and the positive electrode active material layer had a specific surface area of 1.384 m²/g; the positive electrode active material layer had a total surface area of 254.4 m², and the positive electrode active material had a total surface area of 79.4 m²; and the nonaqueous electrolyte was poured so that the positive electrode active material layer had a total surface area of 43.7 m²/g with respect to the total mass of cyclohexylbenzene in the nonaqueous electrolyte and the positive electrode active material had a total surface area of 12.2 m²/g with respect to the total mass of cyclohexylbenzene in the nonaqueous electrolyte.

Overcharge Test

Each prismatic lithium ion secondary battery of Examples 1 to 3 and Comparative Example 1 was charged in an environment at −30° C. at a current of 20 A until the current interruption mechanism was activated, and the state of charge (SOC) when the current interruption mechanism was activated was determined. The battery internal pressure at an SOC of 160% was determined with a load cell. In the prismatic lithium ion secondary battery of Example 1, the current interruption mechanism was activated before the SOC reached 160%, and thus the battery internal pressure at an SOC of 160% was regarded as not less than the internal pressure when the current interruption mechanism was activated.

Table 1 shows the battery internal pressure (MPa) at an SOC of 160% and the SOC (%) when the current interruption mechanism was activated in each overcharge test of the prismatic lithium ion secondary batteries of Examples 1 to 3 and Comparative Example 1, together with the specific surface area of the positive electrode active material, the specific surface area of the positive electrode active material layer, the total surface area of the positive electrode active material with respect to the total mass of cyclohexylbenzene in the electrolyte (the total surface area of the positive electrode active material/the total mass of CHB (m²/g)), and the total surface area of the positive electrode active material layer with respect to the total mass of cyclohexylbenzene in the electrolyte (the total surface area of the positive electrode active material layer/the total mass of CHB (m²/g)).

TABLE 1

| | Specific surface area of positive electrode active material (m²/g) | Specific surface area of positive electrode active material layer (m²/g) | Total surface area of positive electrode active material/total mass of CHB (m²/g) | Total surface area of positive electrode active material layer/ total mass of CHB (m²/g) | Battery internal pressure (MPa) at an SOC of 160% | SOC (%) when the current interruption mechanism was activated |
|---|---|---|---|---|---|---|
| Example 1 | 0.286 | 1.256 | 8.2 | 39.7 | ≥0.47 | 149 |
| Example 2 | 0.336 | 1.289 | 9.6 | 40.7 | 0.39 | 173 |
| Example 3 | 0.340 | 1.283 | 9.8 | 40.5 | 0.37 | 169 |
| Comparative Example 1 | 0.423 | 1.384 | 12.2 | 43.7 | 0.21 | 196 |

From the results shown in Table 1, in Comparative Example 1 in which the positive electrode active material layer had a specific surface area of more than 1.3 m$^2$/g and the positive electrode active material layer had a total surface area of more than 41 m$^2$/g with respect to the total mass of cyclohexylbenzene as the overcharge inhibitor, the overcharge inhibitor in the overcharged battery slowly degraded to slowly increase the battery internal pressure, which delayed the activation of the current interruption mechanism. In contrast, in Examples 1 to 3 in which the positive electrode active material layer had a specific surface area of 1.3 m$^2$/g or less and the positive electrode active material layer had a total surface area of 41 m$^2$/g or less with respect to the total mass of cyclohexylbenzene as the overcharge inhibitor, the overcharge inhibitor in the overcharged battery degraded in a short period of time to increase the battery internal pressure, which activated the current interruption mechanism in a short period of time. These results reveal that the time for activating the current interruption mechanism can be shortened not merely by increasing the surface area of the positive electrode active material layer per mass of the overcharge inhibitor and increasing the surface area of the positive electrode active material per mass of the overcharge inhibitor, but by controlling the surface areas within particular ranges. The reason for this is supposed as below. In Examples 1 to 3, the positive electrode active material layer sufficiently includes voids near the positive electrode active material, and the overcharge inhibitor is present in the voids in a sufficient amount. In addition, the voids in the positive electrode active material layer are in such a condition as the overcharge inhibitor efficiently degrades. This is supposed to allow the current interruption mechanism to be activated in a short period of time if the battery is overcharged.

In the invention, the positive electrode active material preferably has a specific surface area of 0.4 m$^2$/g or less. The positive electrode active material preferably has a total surface area of 10 m$^2$/g or less with respect to the total mass of the overcharge inhibitor.

From the results above, the invention can provide a highly reliable nonaqueous electrolyte secondary battery. The invention can achieve marked advantages when applied to a nonaqueous electrolyte secondary battery having a large battery capacity of 20 Ah or more.

Other Matters

As a positive electrode active material of the nonaqueous electrolyte secondary battery of the invention, a lithium transition-metal composite oxide capable of reversibly absorbing and desorbing lithium ions can be used. Examples of the lithium transition-metal composite oxide include lithium cobalt oxide (LiCoO$_2$), lithium manganese oxide (LiMn$_2$O$_4$), lithium nickel oxide (LiNiO$_2$), lithium nickel manganese oxide (LiNi$_{1-x}$Mn$_x$O$_2$ (0<x<1)), lithium nickel cobalt oxide (LiNi$_{1-x}$Co$_x$O$_2$ (0<x<1)), and lithium nickel cobalt manganese oxide (LiNi$_x$Mn$_y$Co$_x$O$_2$ (0<x<1, 0<y<1, 0<z<1, x+y+z=1)). The lithium transition-metal oxide may further contain Al, Ti, Zr, Nb, B, Mg, or Mo, for example. Examples include lithium transition-metal oxides represented by Li$_{1+a}$Ni$_x$Co$_y$Mn$_z$M$_b$O$_2$ (M is at least one element selected from Al, Ti, Zr, Nb, B, Mg, and Mo, 0≤a≤0.2, 0.2≤x≤0.5, 0.2≤y≤0.5, 0.2≤z≤0.4, 0≤b≤0.02, a+b+x+y+z=1).

As a negative electrode active material of the nonaqueous electrolyte secondary battery of the invention, a carbon material and a silicon material that are capable of reversibly absorbing and desorbing lithium ions can be used. Examples of the carbon material capable of absorption and desorption of lithium ions include graphite, non-graphitizable carbon, graphitizable carbon, fibrous carbon, coke, and carbon black. In particular, it is preferable to use graphite. The negative electrode active material layer containing a carbon material as the negative electrode active material preferably has a packing density of 0.9 to 1.5 g/cm$^3$.

A nonaqueous solvent (organic solvent) in a nonaqueous electrolyte usable for the nonaqueous electrolyte secondary battery of the invention is carbonates, lactones, ethers, ketones, esters, and other solvents that have been generally used in a nonaqueous electrolyte secondary battery, and these solvents may be used as a mixture of two or more of them. Among these, it is preferable to use carbonates, lactones, ethers, ketones, and esters, and it is particularly preferable to use carbonates.

Example of the solvent usable include cyclic carbonates such as ethylene carbonate, propylene carbonate, and butylene carbonate, and chain carbonates such as dimethyl carbonate, ethyl methyl carbonate, and diethyl carbonate. In particular, it is preferable to use a mixed solvent of a cyclic carbonate and a chain carbonate. An unsaturated cyclic carbonate such as vinylene carbonate (VC) may be added to the nonaqueous electrolyte.

As the solute of the nonaqueous electrolyte in the invention, a lithium salt generally used as a solute in nonaqueous electrolyte secondary batteries can be used. Examples of such a lithium salt include LiPF$_6$, LiBF$_4$, LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, LiAsF$_6$, LiClO$_4$, Li$_2$B$_{10}$Cl$_{10}$, Li$_2$B$_{12}$Cl$_{12}$, LiB(C$_2$O$_4$)$_2$, LiB(C$_2$O$_4$)F$_2$, LiP(C$_2$O$_4$)$_3$, LiP(C$_2$O$_4$)$_2$F$_2$, LiP(C$_2$O$_4$)F$_4$, and a mixture of those materials. Among them, it is preferable to use LiPF$_6$ (lithium hexafluorophosphate). The amount of dissolution of the solute with respect to the nonaqueous solvent is preferably 0.5 to 2.0 mol/L.

The separator used for the nonaqueous electrolyte secondary battery in the invention is preferably a porous separator of polyolefin such as polypropylene (PP) and polyethylene (PE). In addition, a separator having a three-layer structure of polypropylene (PP) and polyethylene (PE) (PP/PE/PP or PE/PP/PE) can be used.

What is claimed is:

1. A nonaqueous electrolyte secondary battery comprising:
    an electrode assembly including a positive electrode plate and a negative electrode plate, the positive electrode plate having a positive electrode active material layer containing a positive electrode active material on a surface of a positive electrode substrate;
    a nonaqueous electrolyte;
    an outer body storing the electrode assembly and the nonaqueous electrolyte;
    a positive electrode external terminal;
    a negative electrode external terminal; and
    a current interruption mechanism being provided on at least one of a conductive pathway between the positive electrode plate and the positive electrode external terminal and a conductive pathway between the negative electrode plate and the negative electrode external terminal, the current interruption mechanism interrupting the conductive pathway with an increase in pressure in the outer body; wherein
    the nonaqueous electrolyte contains an overcharge inhibitor,
    the positive electrode active material layer has a specific surface area of 1.3 m$^2$/g or less, and
    a quotient of a total surface area of the positive electrode active material layer (m$^2$)/the total mass of the overcharging inhibitor in the nonaqueous electrolyte (g) is 41 (m$^2$/g) or less.

2. The nonaqueous electrolyte secondary battery according to claim 1, wherein the overcharge inhibitor is a compound having at least one of a cyclohexyl group and a phenyl group.

3. The nonaqueous electrolyte secondary battery according to claim 1, wherein the overcharge inhibitor is at least one selected from the group consisting of cumene, 1,3-diisopropylbenzene, 1,4-diisopropylbenzene, 1-methylpropylbenzene, 1,3-bis(1-methylpropyl)benzene, 1,4-bis(1-methylpropyl)benzene, t-butylbenzene, t-dibutylbenzene, t-amylbenzene, t-diamylbenzene, cyclohexylbenzene, cyclopentylbenzene, biphenyl, and diphenyl ether.

4. The nonaqueous electrolyte secondary battery according to claim 1, wherein the positive electrode active material layer has a porosity of 30 to 40% by volume.

5. The nonaqueous electrolyte secondary battery according to claim 1, wherein the positive electrode active material has an average particle size of 8 to 16 µm.

6. The nonaqueous electrolyte secondary battery according to claim 1, wherein
the positive electrode active material has a specific surface area of 0.4 m$^2$/g or less, and
the quotient of the total surface area of the positive electrode active material layer (m$^2$)/the total mass of the overcharging inhibitor in the nonaqueous electrolyte (g) is 10 (m$^2$/g) or less.

7. The nonaqueous electrolyte secondary battery according to claim 1, wherein the positive electrode active material is a lithium transition-metal oxide, and a negative electrode active material contained in the negative electrode plate is a carbon material.

8. The nonaqueous electrolyte secondary battery according to claim 1, wherein
a protective layer containing an inorganic oxide and an insulating binder is provided on a surface of at least one of the positive electrode plate and the negative electrode plate, and
the inorganic oxide is at least one selected from the group consisting of alumina, titania, and zirconia.

9. The nonaqueous electrolyte secondary battery according to claim 1, wherein the positive electrode active material layer has a specific surface area of from 1.2 to 1.3 m$^2$/g.

* * * * *